United States Patent Office 3,399,827
Patented Sept. 3, 1968

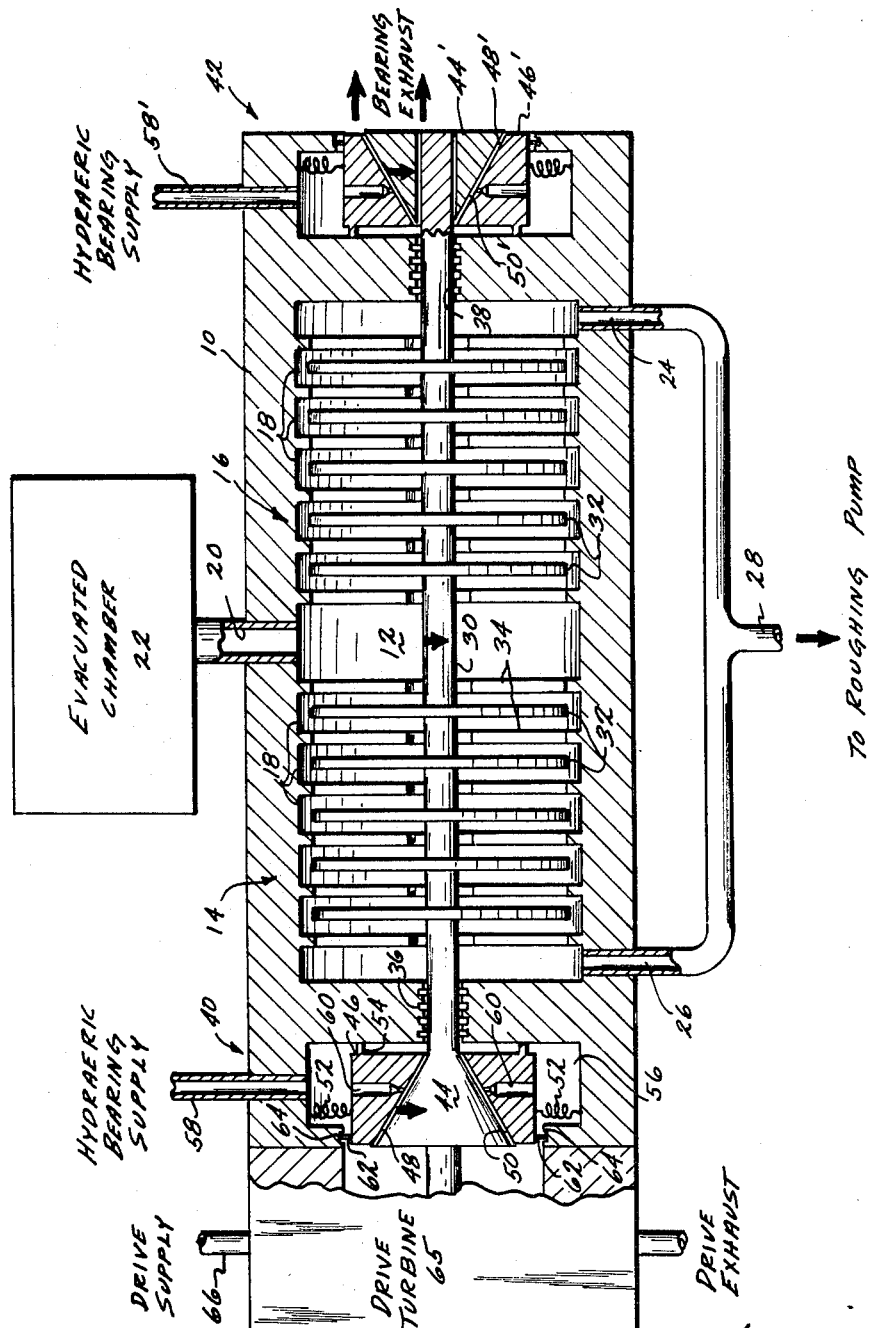

3,399,827
VACUUM PUMP SYSTEM
Everett H. Schwartzman, 457 34th St.,
Manhattan Beach, Calif. 90266
Filed May 19, 1967, Ser. No. 639,756
10 Claims. (Cl. 230—116)

ABSTRACT OF THE DISCLOSURE

The specification discloses an ultra high-speed turbo-molecular vacuum pump driven on a common shaft by a torque-producing gas turbine. The bearings for the common rotor shaft are gas lubricated, and damped, resiliently supported.

---

This invention relates generally to the field of high vacuum pumping and more particularly to a novel gas-fluid, i.e., hydraeric, supported turbo-molecular vacuum pump combination.

Background of the invention

Although the present invention finds particularly advantageous application in the field of gas lubricated, gas turbine driven, ultrahigh-speed, multi-stage molecular vacuum pump systems, and although in the cause of clarity and brevity of disclosure, the following discussion and descripton of examples thereof relate particularly to such systems, it is expressly to be understood that the advantages of the invention are equally well manifest in other applications such as, for example, fluid lubricated, electrically driven, single stage devices, or the like.

With the advent in recent years of a very large and varied need for high vacuum pumping for such uses as evacuation of electron devices and particle accelerators, solid state research and manufacturing, and purification of metal such as germanium and silicon, thin film metallizing, large volume space simulation, and the like, there has arisen a severe need for a more efficient, effective, and reliable high vacuum pumping system. This need has given rise to the relatively high development of the state of the art of purely mechanical high vacuum pumps as opposed to the less reliable and less effective and less versatile oil or molecular diffusion pump, for example. Oil diffusion pumps, it is noted, create a high probability of deleterious backflow of oil molecules into the evacuated chamber.

The multi stage turbo-molecular pump eliminates this gross source of contamination and operates by physical impact and "drag" of molecules in the direction from the chamber to be evacuated to an exhaust port, which may advantageously be directly the input port of the "roughing" vacuum pump.

In a practical example, the turbo-pump comprises a central shaft upon which are mounted a series of rotary impeller blades the surfaces of which are disposed and oriented to maximise the probability of imparting momentum, in a preferred axial direction, toward the exhaust port. The probability may be designated as a pressure differential or turbine compression ratio. Each stage, i.e. each rotor section, develops its own pressure differential; and the overall pressure ratio of the pump is the product of all of its impeller stages. Furthermore, the faster the impeller elements move, the greater the pressure ratio becomes; in fact, the pressure ratio in modern design turbo pumps increases as nearly the cube of the angular velocity of the turbo pump.

Turbo-molecular pumps heretofore known and developed are typically driven by an electric motor which is torque coupled to the turbo pump rotor by means such as a belt. The maximum r.p.m. is 16,000 or less and the rotor is mounted on special ball bearing assemblies which must be lubricated by continuously, cooled oil; and these lubricating hydrocarbons constitute a source of vacuum degrading backflow. Furthermore, the frictional heat created at the bearing not only requires these elaborate lubricating and cooling sub-systems, but also causes a shortened, system lifetime. Additionally, the heat generated increases the likelihood of outgasing of contaminating molecules from the system components, lubricants, and the like. Also, the shorter and finite lifetime increases any damages caused to the evacuating system when the vacuum pump does fail.

Further disadvantages of the electrically driven system are that they are not independent of an electrical power source, they may be run only at discrete synchronous angular velocity, and their vibrations are deleteriously coupled to the turbo pump shaft further limiting its lifetime and reliability at high r.p.m.

Still a further disadvantage of an electrically driven turbo pump is that complex slip clutching overload protection is required during the acceleration phase of operation; and burnout of the motor usually occurs if the pumping chambers are abruptly loaded by gaseous mass due to loss of vacuum or failure of the roughing pump.

Accordingly, it is an object of the present invention to provide a gas-fluid lubricated bearing turbo molecular high vacuum pump which is not subject to these and other disadvantages and limitations of the prior art.

It is another object to provide such apparatus which operates at angular velocities of the order of 100,000 revolutions per minute.

It is another object to provide such apparatus which includes non-electric driving means all on a common balanced, vibration-free shaft and without belt, chains, gears or other torque coupling mechanisms.

It is another object to provide such apparatus which does not require hydrocarbon bearing lubricants or bearing cooling systems or cold traps for such hydrocarbon molecules.

It is another object to provide such apparatus which may be operated at any, infinitely variable, r.p.m. limited only by the strength of metallurgical bond of the rotor components.

Very briefly, these and other objects are achieved in one example of the invention which includes a turbo-molecular rotor component rotationally suspended by one or more gas-fluid lubricated bearings and driven by a turbine rotationally carried by the same shaft. The entire shaft rotor assembly is readily dynamically balanced and free of vibrations due, for example, to effects of harmonics of magnetic and electromagnetic force coupling between different parts of a driving electric motor or between them and other conductive or magnetic material in the environment of the system.

The gas-fluid lubricated bearing is of the character having a rotational member carried by the shaft and separated by the gas film region from a substantially non-rotating bearing. The latter bearing component is resiliently carried by the housing body and a damping mechanism is coupled thereto for damping any oscillation of the non-rotating bearing with respect to the housing. This damping is coupled through the lubricating film to the rotary bearing portion whereby the energy of any radial oscillations of the shaft, which may particularly occur at critical speeds, is absorbed by the damping mechanism.

Further details of these and other novel features. and their operations as well as additional objects and advantages of the invention will become apparent and be best understood from a consideration of the following description taken in connection with the accompanying drawing which is presented by way of an illustrative example only and in which:

The FIGURE is a longitudinal sectional view of an example of a turbo-molecular high vacuum pump system constructed in accordance with the principles of the present invention.

Referring to the FIGURE in detail, it is stressed that the particulars shown are by way of example only and for purposes of illustrative discussion and are presented in the cause of providing what is believed to be the most useful and readily understood description of the principles and structural concepts of the invention. In this regard, no attempt is made to show structural details of the apparatus with more detail than is necessary for a fundamental understanding of the invention. The description taken with the drawing will make it apparent to those skilled in the arts of mechanics and high vacuum engineering how the several forms of the invention may be constructed and embodied in practice. Specifically, the detailed showing is not to be taken as a limitation upon the scope of the invention which is defined by the appended claims forming along with the drawing a part of this specification.

In the FIGURE, the vacuum pump system illustrated includes a housing body 10 defining a pumping chamber 12 having two series 14, 16 of individual, cascaded pumping stages 18. Both series are of the character to pump axially outwardly from a common, centrally disposed input port 20 coupled, as shown, to a device or chamber 22 to be evacuated. The series 16 pumps toward an outlet port 24 and the series 14 pumps toward an outlet port 26. Both outlets are disposed in the end region of the pumping chamber 12 and may be coupled to a common outlet duct 28 for connection directly to an appropriate roughing pump, not shown.

Extending axially through the chamber 12 is a shaft member 30 upon which is carried the rotor sections 32 for each of the stages 18. Each rotor section 32 is provided with blade elements oriented with respect to cooperating blade elements of its respective stator section 34 so as to maximize the probability of molecular impact in the desired axial pumping direction whereby the pressure differential between the inlet duct 20 and the outlet duct 24, 26 is maximized.

The end regions of the pumping chamber 12 are each provided, in this example, with a labyrinth seal 36, 38 disposed cooperatively closely about the shaft member 30. The labyrinth operates to exhibit an unobviously high impedance to gas molecular flow due to the several abrupt "pressure" changes suffered by any flow therealong. The abrupt pressure changes, analogous to optical boundaries exhibiting an abrupt change in the index of refraction and thereby causing reflection, occur as a consequence of the volume changes incumbent with the labyrinth annular lands and grooves, as shown. Furthermore, any leakage that does occur is to an output port portion of the chamber 12 whereby the molecular backflow is readily directed towards the roughing pump and away from the high vacuum inlet region 20. The labyrinth seal shown is an example of a non-contacting and therefore non-frictional heating device which is dry and free of any hydrocarbons or other vacuum degrading lubricating matter.

A bearing assembly 40, 42, is disposed at either end of the chamber 12 axially outside of the seal 36, 38 respectively. These bearings are of generally the gas lubricated character but will be referred to herein as hydraeric since certain incompressible fluids may also be used therein with mechanics considerations similar to those of the gas lubricated bearings per se.

The bearing assembly 40 comprises a bearing journal surface 44 formed on the shaft member 30 and forming a conical figure of revolution about the axis of the shaft member 30. Disposed symmetrically about the surface 44 is an outer bearing member 46 which may also be substantially a figure of revolution having a conical internal surface 48 geometrically similar to the surface 44 and juxtaposed thereabout to define an annular hydraeric lubricating film region 50 the radial thickness of which is typically of the order of $1/1,000$ to $1/10,000$ inch.

The outer bearing member 46 is suspended from the housing body 10, in this example, by a series of angularly equally spaced springs 52 shown schematically in the FIGURE. The member 46 is shown provided with a frictional contacting element 54 for damping radial oscillations from the outer bearing member 46. This damping may be considered as being reflectively coupled back to the rotor or shaft member 30 through the supporting hydraeric film disposed in the region 50 thusly to attenuate and absorb the energy of any component of radial oscillation of the rotating shaft.

The hydraeric fluid for the lubricating film region 50 is supplied to the bearing chamber 56 through a duct 58 and is introduced angularly symmetrically to the region 50 through a series of bearing supply capillaries 60. The bearing chamber 56 is substantially sealed from the surrounding environment by a sealing member 62 disposed as shown in a retaining channel 64 formed in the housing body 10. The exhaust from the lubricating film may be released from the region 50 directly to the atmosphere through the exhaust bores as indicated by the arrows shown extending from the bearing 42 in the FIGURE.

The bearing 42 may be constructed substantially similarly to the bearing assembly 40 except that the angle of conical divergence of the bearing surfaces 44', 48' and of the lubricating and supporting film region 50' of the bearing assembly 42, is opposite to that of their counterparts 44, 48, 50 of the bearing assembly 40. This opposition of the conical surfaces as well as the basic conical nature of the bearings is for the purpose of absorbing, with a single bearing surface, both axial and radial thrust and loading in the bearing supporting the system rotary shaft 30.

Disposed at the left hand end, as viewed in the FIGURE, of the housing body 10 is a drive turbine 65 fed by a gaseous drive supply 66 and the rotor of which is carried by the rigid shaft member 30. The drive turbine rotor is balanced rotationally with substantial precision whereby the entire rotor assembly of drive turbine, bearings, and turbo-molecular pump motor rotor sections 32 is substantially free of any radial imbalances even at angular velocities of the order of 100,000 to 200,000 r.p.m.

There have thus been disclosed and described a number of structural aspects of an example of an ultra high-speed, high vacuum production, turbo-molecular pump which exhibits the advantages and achieves the objects set forth hereinabove.

What is claimed is:

1. Turbo-molecular vacuum pump apparatus comprising:

housing body defining a pumping chamber having pump inlet means and pump outlet means, said pump inlet means being disposed contiguously to a relatively high vacuum region of said chamber and said pump outlet means being disposed contiguously to a relatively lower vacuum region of said chamber:

shaft member extending axially through said chamber and defining a system axis of rotation;

turbo-molecular impact pump stator means carried by said housing body;

turbo-molecular impact pump rotor means carried by said shaft and being of the character, when rotated about said axis with respect to said pump stator means, to impart, in cooperation therewith, an average net velocity and flow of gas molecules through said chamber in the direction from said pump inlet means to said outlet means;

non-contacting seal means carried by said housing body disposed contiguously about said shaft member contiguously to said relatively low vacuum region of said chamber;

hydraeric bearing including, bearing journal surface on said shaft member axially outside of said chamber with respect to said seal means;

outer, substantially non-rotating bearing means;

bearing supporting means for resiliently holding said outer bearing means by and within said housing body with a radially centralizing restoring supporting force, said bearing means having an internal surface geometically similar to that of said bearing journal surface of said shaft member and being juxtaposed thereabout with an annular spacing of juxtaposition which defines a region for a lubricating hydraeric film;

damping means carried by said housing body and force coupled to said bearing supporting means for damping oscillatory motion of said outer bearing means with respect to said housing body; and hydraeric means interposed within said annular spacing for supportingly force coupling said shaft member to said outer bearing means when the former is rotated at a predetermined angular velocity with respect to the latter.

2. The invention according to claim 1 which further includes drive turbine means carried by said shaft member axially outside of said pumping chamber.

3. The invention according to claim 2 in which said bearing support means comprises a plurality of centralizing spring members arranged angularly evenly about said outer bearing means.

4. The invention according to claim 2 in which said damping means comprises frictional contacting means disposed slidingly engagingly between said housing body and said outer bearing means.

5. The invention according to claim 1 in which said internal surface of said outer bearing means and said bearing journal surface of said shaft member are substantially conical.

6. The invention according to claim 5 which includes at least two said hydraeric bearings with at least one such bearing being disposed contiguously to each axial end portion of said pumping chamber and with their conical angles of divergence being oppositely directed in bilateral axial thrust resisting relation.

7. The invention according to claim 6 in which said pump inlet means is disposed contiguously to an axially central portion of said pumping chamber and which includes a plurality of said pump outlet means, at least one thereof being disposed contiguously to each axial end portion of said pumping chamber.

8. The invention according to claim 2 in which said drive turbine means comprises a gas turbine rotor and gas supply means coupled thereto for rotationally actuating it.

9. The invention according to claim 8 in which said shaft member is a rigid, unitary element and in which said drive turbine rotor, said bearing journal surface, said turbo-molecular impact pump rotor means are mounted thereon in precision rotary balanced relationship about said system axis of rotation.

10. The invention according to claim 6 in which said hydraeric bearing is a hydrostatic gas-lubricated configuration and which further includes lubricating gas supply means carried by said housing body and communicating with said annular spacing of juxtaposition.

References Cited

UNITED STATES PATENTS

| | | | |
|---|---|---|---|
| 2,191,345 | 2/1940 | Gaede | 230—118 |
| 3,105,631 | 10/1963 | Hanny | 230—116 |
| 3,332,610 | 7/1967 | Osterstrom | 230—116 |

ROBERT M. WALKER, *Primary Examiner.*